US012761356B2

(12) United States Patent
Chen et al.

(10) Patent No.: US 12,761,356 B2
(45) Date of Patent: Oct. 13, 2026

(54) WEARABLE DEVICE INCLUDING SELF-MIXING INTERFEROMETRY SENSOR

(71) Applicant: Apple Inc., Cupertino, CA (US)

(72) Inventors: Tong Chen, Fremont, CA (US); Edward Vail, Menlo Park, CA (US); Ahmet Fatih Cihan, San Jose, CA (US); Mengshu Huang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 405 days.

(21) Appl. No.: 18/195,862

(22) Filed: May 10, 2023

(65) Prior Publication Data

US 2024/0004073 A1 Jan. 4, 2024

Related U.S. Application Data

(60) Provisional application No. 63/356,924, filed on Jun. 29, 2022.

(51) Int. Cl.

| | |
|---|---|
| ***G01S 17/50*** | (2006.01) |
| ***G01B 9/02*** | (2022.01) |
| ***G01S 17/36*** | (2006.01) |
| ***G01S 17/87*** | (2020.01) |
| ***G06F 3/01*** | (2006.01) |

(52) U.S. Cl.
CPC .......... *G01S 17/50* (2013.01); *G01B 9/02092* (2013.01); *G01S 17/87* (2013.01); *G06F 3/014* (2013.01); *G06F 3/017* (2013.01); *G01S 17/36* (2013.01); *G06F 3/015* (2013.01)

(58) Field of Classification Search
CPC .......... G01S 17/50; G01S 17/36; G01S 17/87; G01B 9/02092; G06F 3/014; G06F 3/017; G06F 3/015
See application file for complete search history.

(56) References Cited

U.S. PATENT DOCUMENTS

| | | | |
|---|---|---|---|
| 7,626,498 B2 | 12/2009 | Aiki et al. | |
| 8,532,751 B2 | 9/2013 | McKenna | |
| 10,331,083 B1 | 6/2019 | Ness et al. | |
| 10,555,079 B2 | 2/2020 | Bakish | |
| 11,277,694 B2 | 3/2022 | Fishman et al. | |
| 11,471,078 B1 * | 10/2022 | Davis | G01J 3/28 |
| 2010/0081940 A1 * | 4/2010 | McKenna | A61B 5/02007 600/479 |
| 2014/0323840 A1 | 10/2014 | Ouwerkerk | |
| 2016/0299570 A1 | 10/2016 | Davydov | |
| 2017/0164878 A1 * | 6/2017 | Connor | G09B 19/00 |
| 2019/0246977 A1 * | 8/2019 | Miller | A61B 5/0059 |
| 2020/0370879 A1 * | 11/2020 | Mutlu | G06F 3/017 |

(Continued)

*Primary Examiner* — Jennifer D Bennett
(74) *Attorney, Agent, or Firm* — Brownstein Hyatt Farber Schreck, LLP

(57) ABSTRACT

A wearable device includes a band and a set of one or more SMI sensors. The band has a band interior opposite a band exterior, and is operable to attach the wearable device to a user. The band defines a cavity, and a portion of the band interior separates the cavity from the user. The set of one or more SMI sensors are disposed in the cavity. The set of one or more SMI sensors are configured to emit electromagnetic radiation toward the portion of the band interior and generate a set of one or more SMI signals including information indicative of movement of the portion of the band interior.

19 Claims, 9 Drawing Sheets

(56) References Cited

U.S. PATENT DOCUMENTS

| | | | |
|---|---|---|---|
| 2021/0010797 | A1 | 1/2021 | Cihan et al. |
| 2021/0072833 | A1* | 3/2021 | Mutlu .................. G06F 3/0308 |
| 2021/0085245 | A1* | 3/2021 | Cihan .................... G06F 1/163 |
| 2021/0104873 | A1 | 4/2021 | Gerlach |
| 2021/0294489 | A1 | 9/2021 | Li et al. |

* cited by examiner

WEARABLE DEVICE INCLUDING SELF-MIXING INTERFEROMETRY SENSOR

CROSS-REFERENCE TO RELATED APPLICATION

This application is a nonprovisional and claims priority under 35 U.S.C. § 119(e) to U.S. Provisional Patent Application No. 63/356,924, filed Jun. 29, 2022, the contents of which are incorporated herein by reference as if fully disclosed herein.

FIELD

The described embodiments generally relate to wearable devices, and in particular to wearable devices that include interferometric sensors, such as self-mixing interferometry (SMI) sensors, and to wearable devices that use such sensors to sense various physical phenomena.

BACKGROUND

Wearable devices such as smart watches may include various sensors, which may sense physical phenomena such as movement, environmental conditions, and biometric data about a user. The data from sensors in a wearable device may be used to provide valuable information to a user, such as information about the activity and/or health of the user. Additional sensors in wearable devices may provide more robust information to a user and/or unlock additional applications of the wearable device. Given the wide range of applications for sensors in wearable devices, any new development in the configuration or operation of the sensors therein can be useful. New developments that may be particularly useful are developments that provide additional sensing capability while maintaining a small form factor.

SUMMARY

Embodiments of the systems, devices, methods, and apparatus described in the present disclosure are directed to the configuration and operation of sensors for wearable devices. The sensors may include interferometric sensors such as SMI sensors. The sensors may be positioned and oriented within the wearable device to sense physical phenomena related to one or more anatomical features of a user, such as one or more blood vessels, muscles, tendons, or the like. In some embodiments, an array of sensors may be operated, and a subset of the sensors that produce signals relevant to the determination of a particular physical phenomena may be identified. The sensors included in the subset of sensors may vary, depending on who is wearing the wearable device, how they are wearing the device, the wearer's physical anatomy, and other factors. In some embodiments the sensors may be positioned, oriented, and operated to obtain information about more than one anatomical feature of a user contemporaneously.

In a first aspect, the present disclosure describes a wearable device. The wearable device may include a band having a band interior opposite a band exterior. The band may be operable to attach the wearable device to the user. The band may define a cavity, and a portion of the band interior may separate the cavity from the user. The wearable device may further include a set of one or more SMI sensors. The one or more SMI sensors may be disposed in the cavity. The one or more SMI sensors may be configured to emit electromagnetic radiation toward the portion of the band interior, and generate a set of one or more SMI signals including information indicative of movement of the portion of the band interior.

In another aspect, the present disclosure describes a method of operating a wearable device. The method may include generating a number of SMI signals, each from a respective SMI sensor disposed in a band operable to attach the wearable device to a user. The method may further include identifying, by a processor of the wearable device, a subset of the SMI signals relevant to the determination of biometric data about the user. The method may additionally include determining, by the processor and based, at least in part, on the subset of the SMI signals, the biometric data about the user.

In another aspect, the present disclosure describes a wearable device. The wearable device may include a band operable to attach the wearable device to a user, a first set of SMI sensors disposed in the band, a second set of SMI sensors disposed in the band, and processing circuitry. The first set of SMI sensors may be configured to emit electromagnetic radiation toward a first anatomical feature of the user and generate a first set of SMI signals including information about the first anatomical feature. The second set of SMI sensors may be configured to emit electromagnetic radiation toward a second anatomical feature of the user and generate a second set of SMI signals including information about the second anatomical feature. The processing circuitry may be communicably coupled to the first set of SMI sensors and the second set of SMI sensors and configured to determine information about the user using one or more SMI signals from the first set of SMI sensors and one or more SMI signals from the second set of SMI sensors.

In addition to the exemplary aspects and embodiments described herein, further aspects and embodiments will become apparent by reference to the drawings and by study of the following description.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

Figure 1:
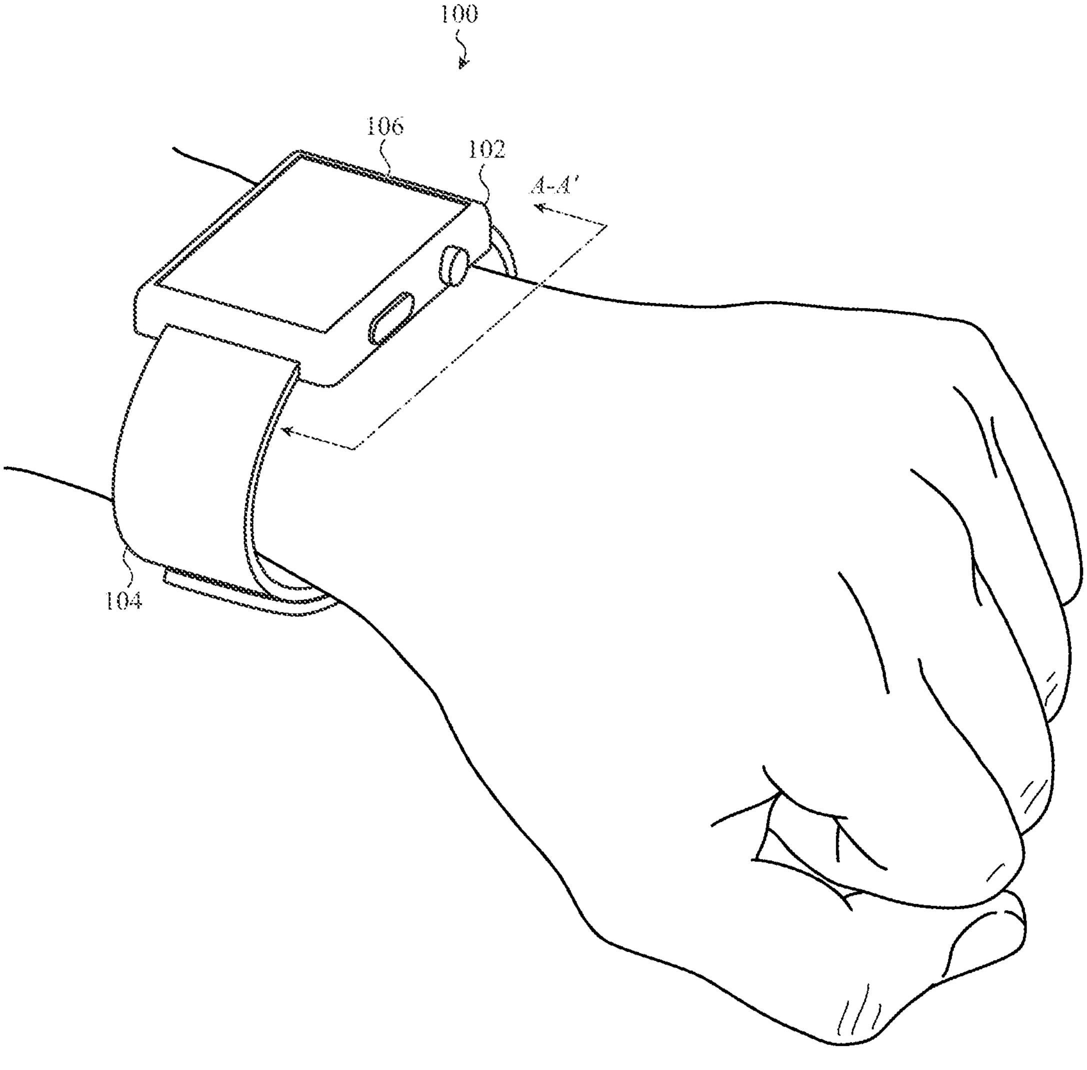
FIG. 1 shows an exemplary wearable device being worn by a user, such as described herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Coherent optical sensing, including Doppler velocimetry and heterodyning, can be used to measure physical phenomena including presence, distance, velocity, size, surface properties, and particle count. Interferometric sensors such as SMI sensors may be used to perform coherent optical sensing. An SMI sensor is defined herein as a sensor that is configured to generate and emit light from a resonant cavity of a semiconductor light source, receive a reflection or backscatter of the light (e.g., light reflected or backscattered from an object) back into the resonant cavity, coherently or partially coherently self-mix the generated and reflected/backscattered light within the resonant cavity, and produce an output indicative of the self-mixing (i.e., an SMI signal). The generated, emitted, and received light may be coherent or partially coherent, but a semiconductor light source capable of producing such coherent or partially coherent light may be referred to herein as a coherent light source. The generated, emitted, and received light may include, for example, visible or invisible light (e.g., green light, infrared (IR) light, or ultraviolet (UV) light). The output of an SMI sensor (i.e., the SMI signal) may include a photocurrent produced by a photodetector (e.g., a photodiode). Alternatively or additionally, the output of an SMI sensor may include a measurement of a current or junction voltage of the SMI sensor's semiconductor light source.

Generally, an SMI sensor may include a light source and, optionally, a photodetector. The light source and photodetector may be integrated into a monolithic structure. Examples of semiconductor light sources that can be integrated with a photodetector include vertical cavity surface-emitting lasers (VCSELs), edge-emitting lasers (EELs), horizontal cavity surface-emitting lasers (HCSELs), vertical external-cavity surface-emitting lasers (VECSELs), quantum-dot lasers (QDLs), quantum cascade lasers (QCLs), and light-emitting diodes (LEDs) (e.g., organic LEDs (OLEDs), resonant-cavity LEDs (RC-LEDs), micro LEDs (mLEDs), superluminescent LEDs (SLEDS), and edge-emitting LEDs). These light sources may also be referred to as coherent light sources. A semiconductor light source may be integrated with a photodetector in an intra-cavity, stacked, or adjacent photodetector configuration to provide an SMI sensor.

Generally, SMI sensors have a small footprint and are capable of measuring myriad physical phenomena. Accordingly, they are well suited for use in wearable devices, which are generally limited in size. As discussed herein, a portion of the functionality of many wearable devices is directed to the measurement of biometric data about a user, such as heart rate and respiration rate. Current wearable devices generally concentrate or exclusively position sensors for measuring biometric data in a housing, which is over or in contact with a small portion of a user's body when the device is worn. The sensors in the housing are thus limited to taking measurements only from the portion of the user's body over/on which the housing is provided. Accordingly, the extent and/or accuracy of the biometric data determined based on measurements from the sensors may be limited. As described in various embodiments herein, SMI sensors provide an opportunity to distribute sensors not only in a housing of a wearable device, but also (or instead) within a band operable to attach the housing to a user. This increases the area of the user observable by the sensors, which can result in the determination of additional biometric data and/or improved accuracy of biometric data.

As described in various embodiments herein, SMI sensors may be used to determine biometric data such as movement, and in particular muscle, ligament, tendon, and/or skin movement, blood flow, blood pressure, heart rate, and respiration rate. Distributing SMI sensors uniformly or in a desired pattern within a band of a wearable device, a housing of a wearable device, or both, may enable the determination of the aforementioned biometric data (i.e., by positioning and/or orienting the SMI sensors in a location in which it is possible to measure) or improve the accuracy of the aforementioned biometric data (i.e., by providing measurements from multiple locations). Distributing SMI sensors within a band of a wearable device may further provide information about more than one anatomical feature contemporaneously (and in some embodiments, simultaneously), which may improve accuracy of biometric data or enable the determination of biometric data, such as, for example, blood pressure.

To measure movement using SMI sensors, one or more SMI sensors may be provided in a cavity such that electromagnetic radiation is emitted toward a wall of the cavity. The wall of the cavity may be deformable or flexible, and the cavity may be positioned and oriented to be pressed against a desired portion of a user's body when the device is worn (e.g., such that it is over a particular anatomical feature such as a muscle, ligament, tendon, blood vessel, organ, or portion of skin). By measuring movement of the cavity wall, the one or more SMI sensors may thus measure movement of a particular anatomical feature of the user. The cavity may be defined by the band. In some embodiments, the band may define multiple cavities, which are distributed uniformly throughout the band or in a desired pattern (e.g., in groups or subsets) such that when the device is worn the cavities are over probable locations of particular anatomical features of the user (e.g., muscles, ligaments, and tendons).

As discussed herein, distributing SMI sensors throughout the band and/or housing of a wearable device, either uniformly or in a desired pattern, may enable the determination of additional biometric data or improve accuracy. However, users can have varying anatomy and users may wear the wearable device different. Consequently, when the wearable device is worn only a subset of the SMI sensors may be positioned and oriented over anatomical features that provide relevant or usable measurements. For example, when the device is worn, some SMI sensors may be positioned and oriented such that the SMI signals provided therefrom include information about blood flow through a blood vessel of the user, while other SMI sensors may be positioned and oriented such that they provide no valuable or usable data (e.g., a signal-to-noise ratio (SNR) of the SMI signal provided therefrom may be too low). Accordingly, processing circuitry in the wearable device may be configured to identify a subset of SMI signals, out of a larger set of SMI signals, that is relevant to a determination of biometric data about the user, and use only the subset of SMI signals to determine the biometric data about the user. The identification of the subset of SMI signals may be based on qualities of the signals themselves (e.g., SNR), a known position of the SMI sensors from which the SMI signals are provided, or any other information available to the processing circuitry.

These foregoing and other embodiments are discussed below with reference to FIGS. 1-8. However, those skilled in the art will readily appreciate that the detailed description given herein with respect to these figures is for explanation only and should not be construed as limiting.

Directional terminology, such as "top", "bottom", "upper", "lower", "front", "back", "over", "under", "above", "below", "left", or "right" is used with reference to the orientation of some of the components in some of the figures described below. Because components in various embodiments can be positioned in a number of different orientations, directional terminology is used for purposes of illustration only and is usually not limiting. The directional terminology is intended to be construed broadly, and therefore should not be interpreted to preclude components being oriented in different ways. Also, as used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

FIG. 1 shows an exemplary wearable device 100 according to one embodiment of the present description. For purposes of illustration, the wearable device 100 is shown as a watch worn on the wrist of a user. However, the principles described herein are not limited to any particular type of wearable device, and may also be applied to wearable devices having any form factor and wearable devices worn on any part of a user's body. The wearable device 100 may include a housing 102 and a band 104. Generally, the housing 102 may include the electronic components necessary for providing the functionality of the wearable device 100, such as a battery, processing circuitry (e.g., one or more processors), communications circuitry, etc. In some embodiments, the housing 102 may include a display 106, which allows a user to interact with the wearable device 100. In some embodiments, the housing 102 may alternatively or further include one or more additional user interface elements such as buttons, dials, and the like. The band 104 may be operable to attach the wearable device 100, and in particular the housing 102, to a user.

Figure 2:
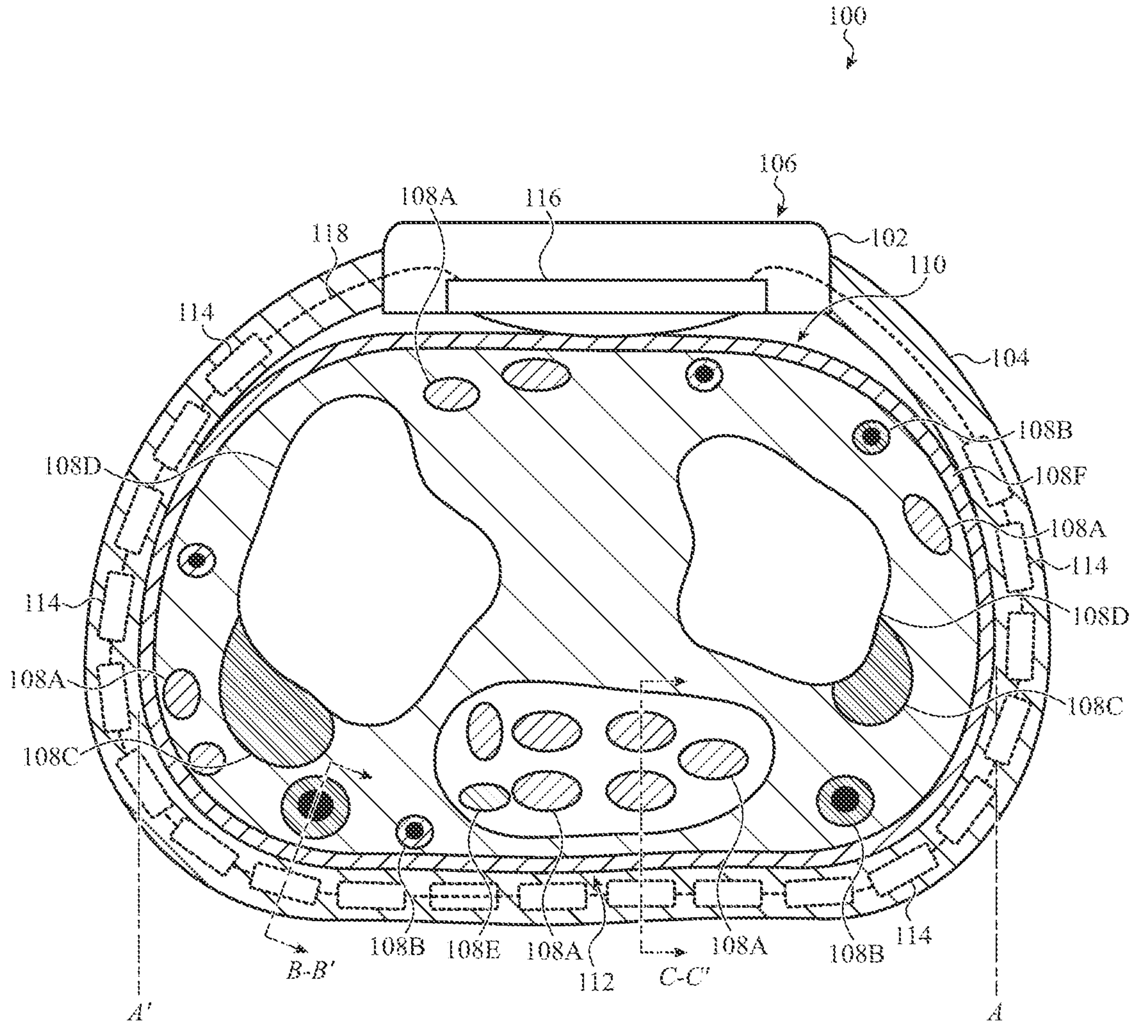
FIG. 2 shows a cross-sectional view of an exemplary wearable device being worn by a user, such as described herein.

FIG. 2 shows a cross-sectional view of the wearable device 100 as viewed through lines A-A' of FIG. 1. For purposes of illustration, the cross-sectional view depicts particular anatomical features 108 within the wrist of the user. In particular, FIG. 2 shows a number of tendons 108A, blood vessels 108B, muscles 108C, bones 108D, and nerves 108E within the wrist of the user, as well as the user's skin 108F. As discussed herein, current wearable devices often include sensors concentrated or exclusively located within the housing thereof, which is positioned and oriented on or over only a small portion of a user's body. For example, in FIG. 2 the housing 102 of the wearable device 100 is positioned over only a small portion of the user's wrist. Accordingly, providing sensors only in the housing 102 effectively limits the extent of a user's anatomy that is observable by the wearable device 100. This is especially true when the wearable device 100 is a watch worn on the user's wrist, since the housing 102 is generally positioned and oriented over a dorsal aspect 110 of the wrist, which, as shown in FIG. 2, is relatively sparse with anatomical features 108. A volar aspect 112 of the wrist, which is opposite the dorsal aspect 110, includes a relatively high concentration of anatomical features 108, and thus it may be desirable to provide sensors around or over this area.

Accordingly, the wearable device 100 includes a number of sensors 114 distributed throughout the band 104. While the sensors 114 are shown uniformly or semi-uniformly distributed throughout a length of the band 104, the sensors 114 may be distributed throughout the band 104 in any desired pattern, such as a pattern designed to position and orient sensors 114 over the probable locations of particular anatomical features 108 when the wearable device 100 is worn by a user. The sensors 114 may be communicably coupled to one another and/or to additional circuitry, such as processing circuitry 116 located in the housing 102, via one or more signal carriers 118 running through the band 104. The signal carriers 118 may be conductive wires, optical fibers, or any other suitable type of signal carrier. In some embodiments, the signal carriers 118 may also be power carriers, such that power is provided to the sensors 114 via the signal carriers 118. While not shown, the sensors 114 may be distributed not only along the length of the band 104 in any desired pattern, but also along the width of the band 104, which extends into the page as shown in FIG. 2. In some embodiments, the sensors 114 may be positioned side-by-side, in a staggered arrangement, or at various different positions along the width of the band 104. In other words, the sensors 114 may be distributed in the band 104 in any desired two-dimensional pattern.

The band 104 of the wearable device 100 may be relatively thin and flexible to allow the wearable device 100 to be easily attached to a user. For example, the band 104 may include a flexible silicone material, a flexible textile, a series of articulating metal links, or other elements or materials. Accordingly, any sensors 114 should be capable of integrating into or at least partially within the band 104 without compromising the functionality thereof. SMI sensors are particularly well suited for integration in the band 104 due to the small footprint thereof. Further, SMI sensors may be well-suited to measuring biometric data about a user. For example, SMI sensors may be capable of measuring biometric data such as blood flow, blood pressure, heart rate, respiration rate, and movement of a user as discussed below. Accordingly, in some embodiments the sensors 114 distributed throughout the band 104 may be SMI sensors. As discussed below, the SMI sensors may be configured in the same or different ways to measure the same or different physical phenomena and thus provide the same or different biometric data.

Figure 3A:
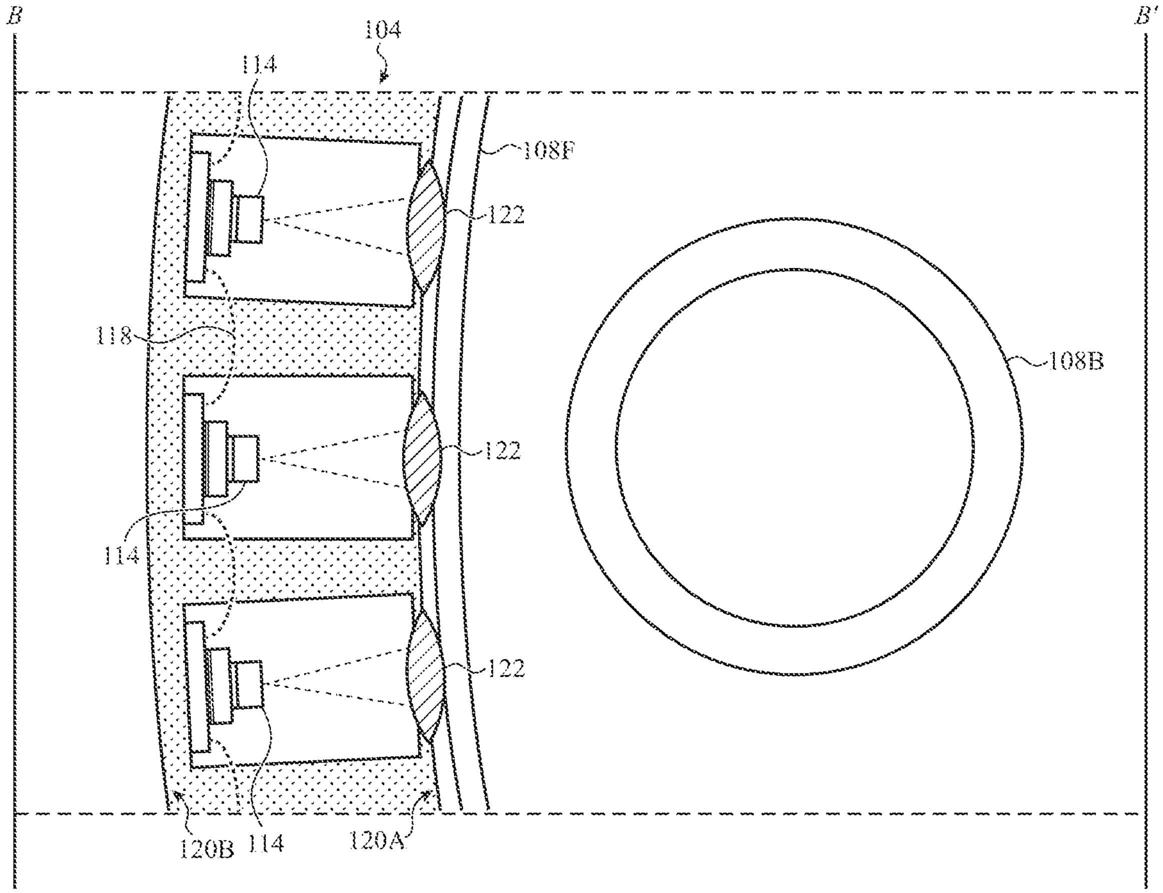
FIGS. 3A and 3B show cross-sectional views of a portion of exemplary sensors disposed in a wearable device, such as described herein.

FIG. 3A shows a cross-sectional view illustrating a number of SMI sensors 114 integrated into the band 104 of the wearable device 100 as viewed through line B-B' of FIG. 2. For purposes of illustration, the band 104 of the wearable device is shown against a user's skin 108F, and a blood vessel 108B of a user is also shown. The band 104 may include a band interior 120A, which sits against the user's skin 108F, and a band exterior 120B opposite the band interior 120A. Each of the SMI sensors 114 may be positioned and oriented in the band 104 so that the SMI sensors 114 emit electromagnetic radiation (e.g., visible or invisible light) toward the blood vessel 108B. Notably, the blood vessel 108B is only one example of an anatomical feature 108 that the SMI sensors 114 may be positioned and oriented over, and the principles of the present disclosure apply to the measurement of information about any anatomical feature of a user. Each SMI sensor 114 may be disposed in a cavity defined by the band 104. A lens 122 may be provided over each one of the SMI sensors 114 in order to direct and/or focus electromagnetic radiation in a desired pattern. Each lens 122 may be exposed via an opening in the band interior 120A. In some embodiments, each lens 122 may be covered by at least a portion of the band interior 120A such that the electromagnetic radiation is still transmissible through the portion of the band interior 120A. While the band interior 120A and each lens 122 are shown directly against the user's skin 108F, the principles of the present disclosure may also apply when the band 104 is worn loosely and thus an air gap is present between the band interior 120A and the user's skin 108F, and thus between each lens 122 and the user's skin 108F.

The electromagnetic radiation emitted from each one of the SMI sensors 114 may be configured to partially or completely penetrate the user's skin 108F. Further, the electromagnetic radiation emitted from each one of the SMI sensors 114 may be configured to be partially reflected and/or backscattered by walls of the blood vessel 108B, blood flowing within the blood vessel 108B, or both. The partially reflected and/or backscattered electromagnetic radiation may travel back toward each SMI sensor 114, be directed and/or focused by the associated lens 122, and subsequently self-mix (or interfere) with the generated electromagnetic radiation. The self-mixing may be measured (e.g., by measuring the electromagnetic radiation with a photodetector or by measuring a current and/or junction voltage of a light source of the SMI sensor 114) to generate an SMI signal. By generating the electromagnetic radiation via specific drive patterns (e.g., via doppler and/or triangular drive patterns) and measuring the reflection and/or backscatter thereof, the SMI signals may include information about blood flow of the user. Accordingly, biometric data such as blood flow, including blood flow velocity, blood flow volume, and the like, may be determined based on the SMI signals. The SMI signals may further be used to determine additional biometric data such as, for example, blood pressure and respiration rate. The SMI sensors 114 may be communicably coupled to one another and/or to the processing circuitry 116 via the signal carriers 118. While signal carriers 118 are shown connecting each one of the SMI sensors 114, in various embodiments some or all of the SMI sensors 114 may be connected directly to processing circuitry 116, rather than to one another. The processing circuitry 116, as well as other intervening circuitry (not shown), may operate the SMI sensors 114 as discussed herein to determine biometric data about the user. While three SMI sensors 114 are shown in FIG. 3A, the particular number and density of SMI sensors 114 shown is for purposes of illustration only. The band 104 may include any number of SMI sensors 114 in any density or pattern without departing from the principles of the present disclosure.

Figure 3B:
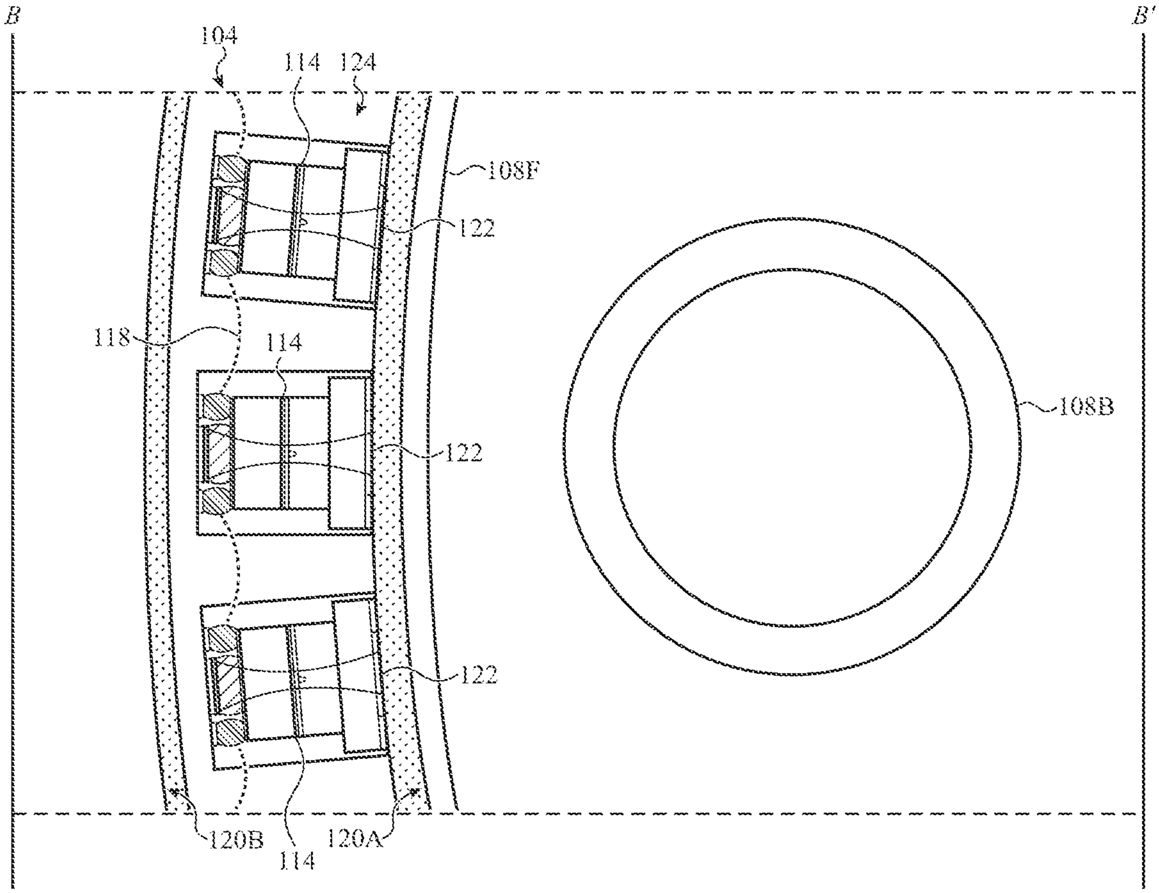

FIG. 3B shows a cross-sectional view illustrating a number of SMI sensors 114 integrated into the band 104 of the wearable device 100 as viewed through line B-B' of FIG. 2 according to an additional embodiment of the present disclosure. While the SMI sensors 114 are shown separately integrated into the band 104 in FIG. 3A, FIG. 3B shows the SMI sensors 114 integrated into a flexible electronic substrate 124, such as a flexible printed circuit board, which is disposed between the band interior 120A and the band exterior 120B. Further, while the lenses 122 are separate from the SMI sensors 114 in FIG. 3A, each one of the SMI sensors 114 in FIG. 3A includes an integrated lens 122, which may be integrated during manufacture of each one of the SMI sensors 114. The integrated lens 122 of each one of the SMI sensors 114 may be exposed via an opening in the band interior 120A, or may be covered by a portion of the band interior 120A such that the electromagnetic radiation generated by the SMI sensors 114 is still transmissible through the portion of the band interior 120A. While not shown, the SMI sensors 114 including an integrated lens 122 may be used separately from the flexible electronic substrate 124, and the flexible electronic substrate 124 may be used with SMI sensors 114 having separate lenses 122 such as those shown in FIG. 3A. Integrating the SMI sensors 114 into the flexible electronic substrate 124 and using integrated lenses 122 for the SMI sensors 114 may reduce manufacturing complexity and improve reliability or ruggedness of the SMI sensors 114 in some embodiments.

The SMI sensors 114 shown in FIG. 3B may operate in a similar manner to those discussed herein with respect to FIG. 3A. In particular, the SMI sensors 114 may emit electromagnetic radiation (e.g., visible or invisible light) toward the blood vessel 108B of the user. The electromagnetic radiation may be configured to partially or completely penetrate the skin 108F of the user, and be partially reflected and/or backscattered by walls of the blood vessel 108B, blood in the blood vessel 108B, or both. The reflected and/or backscattered electromagnetic radiation may travel back toward the SMI sensors 114 and focused/directed by the integrated lens 122, where it is self-mixed with the generated electromagnetic radiation and measured to generate SMI signals that include information about blood flow in the blood vessel 108B. The processing circuitry 116 may then determine biometric information related to blood flow, blood pressure, heart rate, and/or respiration based on the SMI signals. While three SMI sensors 114 are shown in FIG. 3B, the particular number and density of SMI sensors 114 shown is for purposes of illustration only. The band 104 may include any number of SMI sensors 114 in any density or pattern without departing from the principles of the present disclosure.

Figure 4:
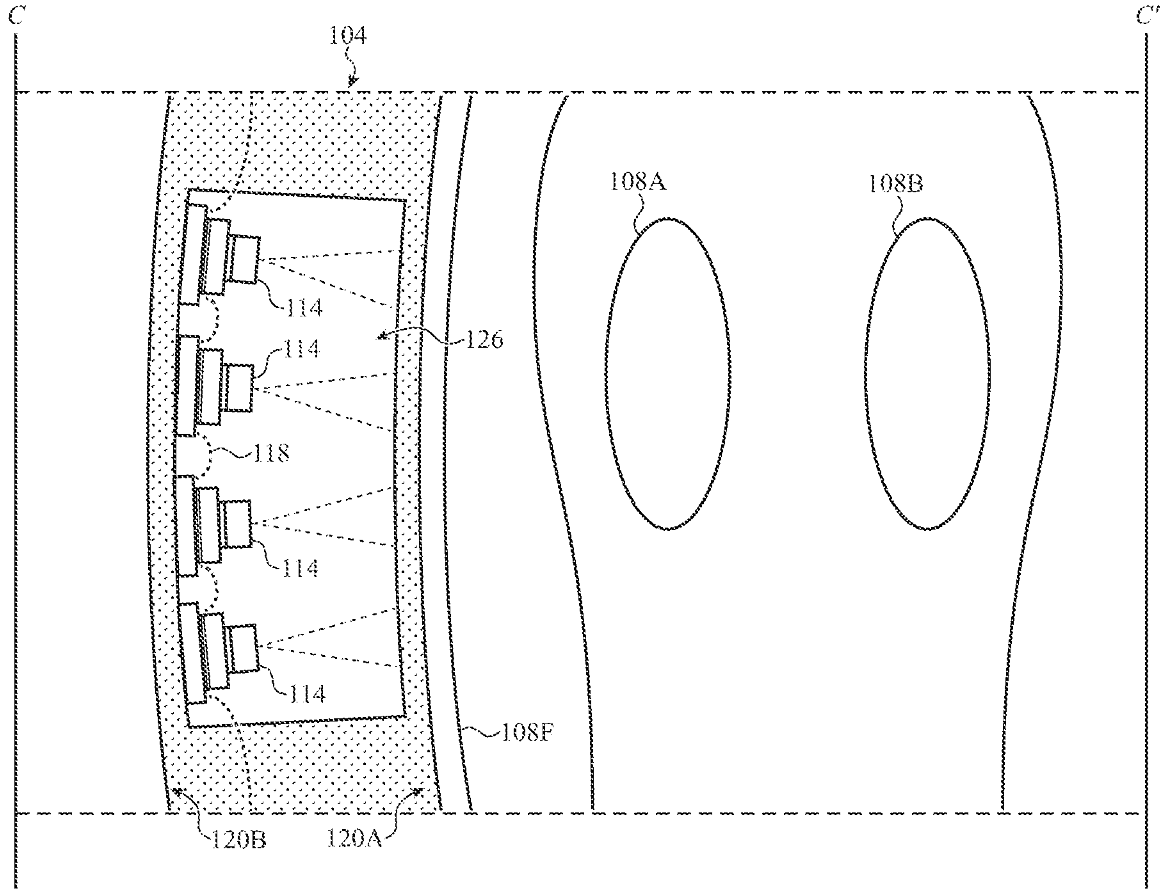
FIG. 4 shows a cross-sectional view of exemplary sensors disposed in a wearable device, such as described herein.

While the configuration of SMI sensors 114 shown in FIG. 3A and FIG. 3B are focused on measurement of biometric data related to blood flow, SMI sensors may also be configured to measure movement of particular anatomical features of a user. Such movement information may be useful, for example, in determining gestures performed by a user. FIG. 4 shows a cross-sectional view of SMI sensors 114 integrated into the band 104 of the wearable device 100 through line C-C' of FIG. 2. For purposes of illustration, the band 104 of the wearable device is shown against a user's skin 108F, and a number of tendons 108A of the user are also shown. The band 104 defines a cavity 126 such that a portion of the band interior 120A is located between the cavity 126 and the user. The SMI sensors 114 are disposed within the cavity 126. The portion of the band interior 120A may include a material or have a coating on the interior side of the cavity 126 such that the portion of the band interior 120A at least partially reflects and/or backscatters electromagnetic radiation emitted by the SMI sensors 114. Further, the portion of the band interior 120A may be deformable, flexible, or otherwise capable of translating movement of the user into a proportional amount of movement. In particular, as the tendons 108A of the user change in size and shape due to flexion of the wrist or other movement, the portion of the band interior 120A may deform, flex, or move in a proportional manner. The SMI sensors 114 may emit electromagnetic radiation toward the portion of the band interior 120A, which partially reflects and/or backscatters the electromagnetic radiation back toward the SMI sensors 114. The reflected and/or backscattered electromagnetic radiation may self-mix with the generated electromagnetic radiation and measured to generate SMI signals from each one of the SMI sensors 114. Changes in the resulting SMI signals may reflect changes in the distance to the portion of the band interior 120A and thus include information about movement of the portion of the band interior 120A. As discussed herein, movement of the portion of the band interior 120A is indicative of movement of the user, and in the particular example shown in FIG. 4, of the tendons 108A of the user. The SMI signals may be processed by the processing circuitry 116 to determine movement information about the user, and further may be used to determine gestures performed by the user. Gestures performed by the user may include, for example, hand gestures, such as the clenching of a fist, a thumbs up, pointing, or any other hand gesture. While the foregoing example is related to measuring movement of tendons 108A of the user, the same principles can be used to measure the movement of any anatomical feature 108 of the user. For example, the portion of the band interior 120A may be positioned over a blood vessel 108B of the user such that movement of the portion of the band interior 120A is indicative of a pulse of the user.

While four SMI sensors 114 are shown in the cavity 126 in FIG. 4, the particular number and density of SMI sensors 114 shown is for purposes of illustration only. The band 104, and in particular each cavity 126 defined by the band, may include any number of SMI sensors 114 in any density or pattern. Providing multiple SMI sensors 114 in the cavity 126 may provide the ability to characterize the movement of a user with additional resolution, for example, by determining an amount of movement at particular portions of the portion of the band interior 120A or generating a movement profile across the surface area of the portion of the band interior 120A. However, in some embodiments only a single SMI sensor 114 may be suitable for measuring movement of the portion of the band interior 120A. In various embodiments, the cavity 126 may be empty, filled with a gas, filled with a fluid, or filled with a gel. If the cavity 126 is filled, it is generally desirable to use a material that is transmissible to the electromagnetic radiation emitted by the SMI sensors 114 (e.g., an optically transmissible medium).

While FIG. 3A, FIG. 3B, and FIG. 4 show example configurations for the sensors 114 distributed in the band 104, the present disclosure is not limited to these particular configurations. The sensors 114 distributed throughout the band 104 may be arranged in any configuration suitable for measuring information about the anatomy or physiology of a user or any other physical phenomena without departing from the principles of the present disclosure. The configuration of sensors 114 in the figures herein may also be mixed such that some of the sensors 114 in the band 104 are configured as shown in FIG. 3A, other sensors 114 are configured as shown in FIG. 3B, other sensors are configured as shown in FIG. 4, or any combination thereof. The configuration of sensors 114 in any of FIGS. 3A-4 may also be used independently of one another (e.g., in separate bands 104), or mixed and matched in any manner within a single band 104. The particular configuration of the sensors 114 may change based on their location in the band 104. For example, areas of the band that are over the probable location of one or more blood vessels 108B may be configured as shown in FIG. 3A or FIG. 3B, while areas of the band that are over the probable location of one or more tendons 108A may be configured as shown in FIG. 4. Alternatively, the configuration of the sensors 114 may be alternated in a predetermined pattern along the length thereof.

Figure 5A:
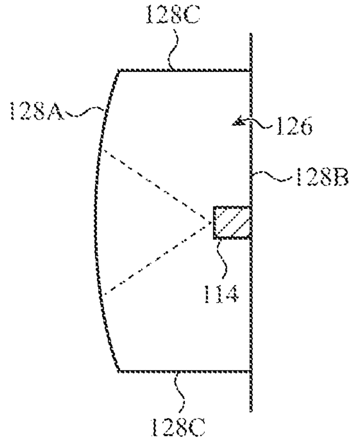
FIGS. 5A through 5D show cross-sectional views of exemplary sensors for use in a wearable device, such as described herein.

As discussed with respect to FIG. 4, the portion of the band interior 120A is configured to translate movement of a user into a proportional amount of deformation, flex, or movement, which can be detected by the SMI sensors 114 in the cavity. This functionality can be achieved in multiple different ways as shown in FIGS. 5A-5D, which illustrate various configurations for walls of the cavity 126 to achieve the desired translation of movement from a user to the portion of the band interior 120A. FIG. 5A shows the cavity 126 including a first cavity wall 128A defined by the portion of the band interior 120A, a second cavity wall 128B opposite the first cavity wall 128A, and a cavity sidewall 128C joining the first cavity wall 128A and the second cavity wall 128B. One or more SMI sensors 114 are disposed on the second cavity wall 128B such that electromagnetic radiation generated therefrom is emitted toward the first cavity wall 128A. The first cavity wall 128A is flexible or deformable such that pressure on the first cavity wall 128A causes deformation, flex, or movement thereof. The second cavity wall 128B and the cavity sidewall 128C may be rigid.

Figure 5B:
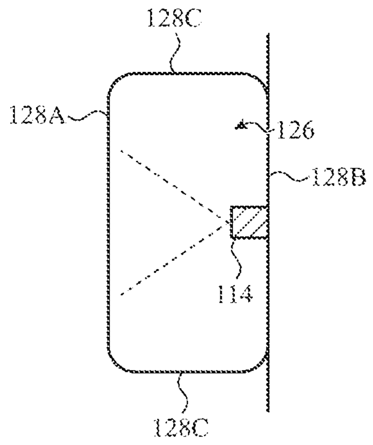

FIG. 5B shows the cavity 126 wherein the first cavity wall 128A and the cavity sidewall 128C are deformable or flexible, while the second cavity wall 128B is rigid. Providing the cavity sidewall 128C such that it is deformable may result in increased sensitivity of movement detection in some embodiments, as it may result in a higher degree of deformation, flex, or movement in response to movement of a user.

Figure 5C:
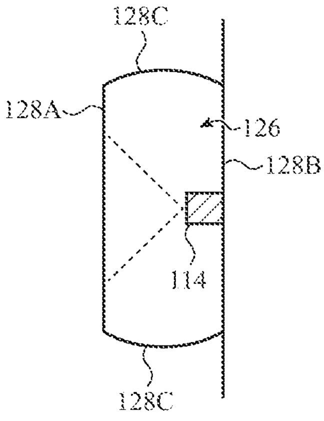

FIG. 5C shows the cavity 126 wherein the first cavity wall 128A and the second cavity wall 128B are rigid, while the cavity sidewall 128C is deformable or flexible. Pressure placed on the first cavity wall 128A may cause deformation, flex, or movement of the cavity sidewall 128C, which causes the distance between the first cavity wall 128A and the one or more SMI sensors 114 to change, thereby allowing for the detection of movement by the one or more SMI sensors 114. The configuration of the cavity 126 shown in FIG. 5C may be desirable when the band interior 120A requires additional rigidity or structure, or to improve ruggedness of the band 104, which may be desirable in some scenarios.

Figure 5D:
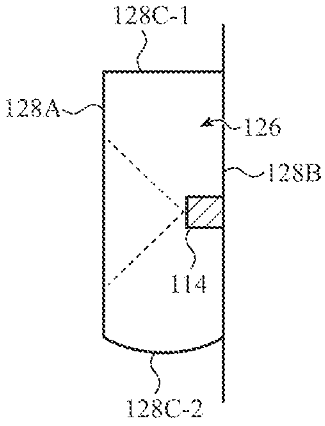

FIG. 5D shows the cavity wherein the first cavity wall 128A and the second cavity wall 128B are rigid. Further, a first portion of the cavity sidewall 128C-1 is rigid, while a second portion of the cavity sidewall 128C-2 is deformable or flexible, thereby placing the first cavity wall 128A in a cantilever configuration. Pressure placed on the first cavity wall 128A may cause deformation, flex, or movement of the second portion of the cavity sidewall 128C-2, which causes the distance between the first cavity wall 128A and the one or more SMI sensors 114 to change, thereby allowing for the detection of movement by the one or more SMI sensors 114. The configuration of the cavity 126 shown in FIG. 5D may provide additional control over the proportionality of the movement of the portion of the band interior 120A to user movement and/or improved ruggedness of the band 104, which may be desirable in some scenarios.

The particular configuration for the walls of the cavity 126, as well as the filling provided in the cavity 126, may be chosen based on a desired sensitivity (i.e., how much deformation, flex, or movement should occur for a corresponding pressure), a desired rigidity of the cavity, a desired ruggedness, etc. While the cavity 126 is discussed herein in relation to a band of a wearable device, the configuration of the cavity 126 and operation of the SMI sensors 114 therein may apply to any portion or type of device, including applications outside of wearable devices. In general, providing one or more SMI sensors in a cavity and measuring movement of a wall of the cavity may be useful for measuring any number of physical phenomena. Designing said cavity wall to have a desired amount of deformation or flex may be especially useful in these scenarios.

Figure 6:
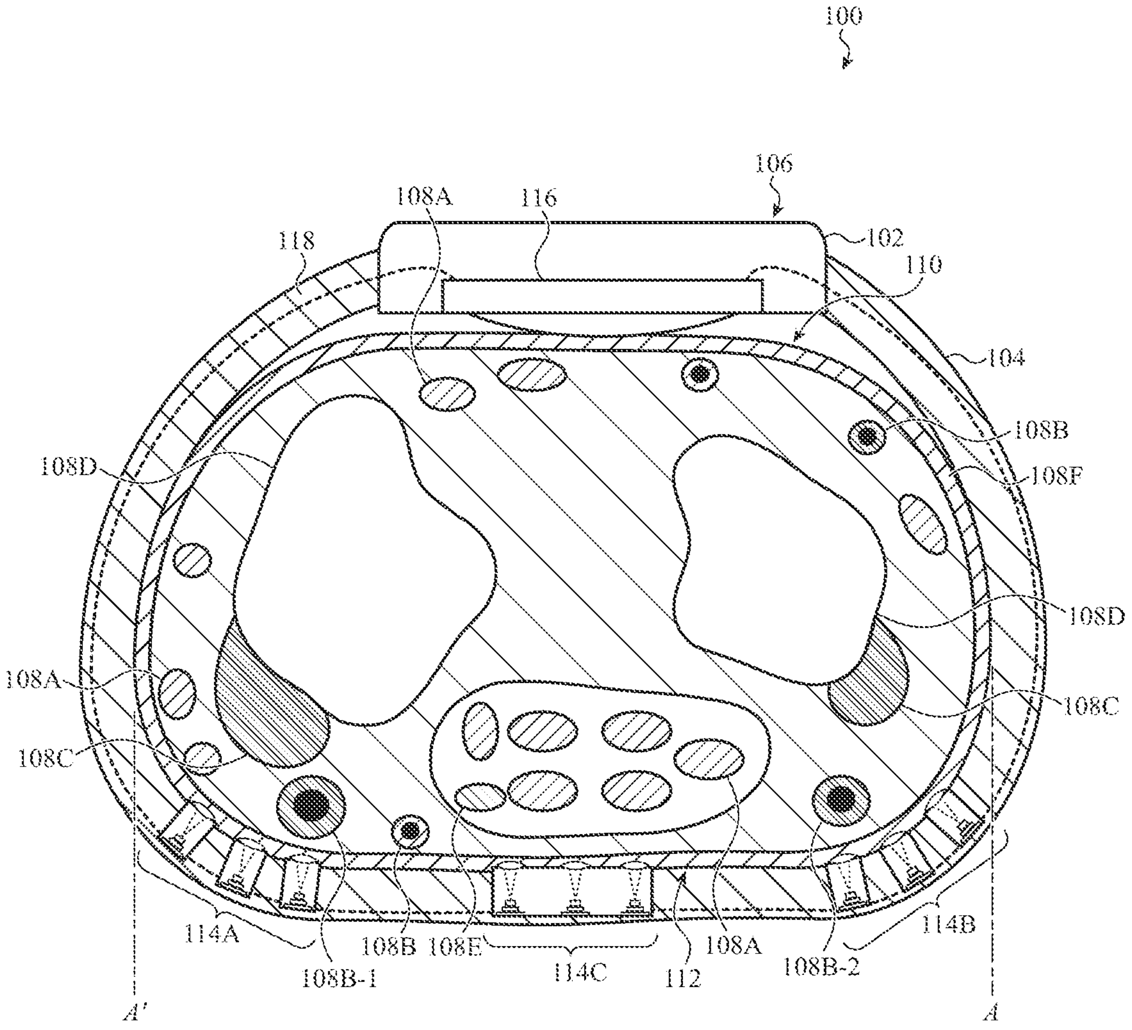
FIG. 6 shows a cross-sectional view of an exemplary wearable device being worn by a user, such as described herein.

FIG. 6 shows the wearable device 100 as viewed through lines A-A' of FIG. 1 according to an additional embodiment of the present disclosure. The wearable device 100 shown in FIG. 6 is similar to that shown in FIG. 2, except that instead of the sensors 114 being uniformly or semi-uniformly distributed throughout a length of the band 104, the sensors 114 are positioned and oriented to be located over the probable locations of particular anatomical features 108 of the user. In particular, a first set of SMI sensors 114A are positioned and oriented over the probable location of the radial artery 108B-1 of the user, a second set of SMI sensors 114B are positioned and oriented over the probable location of the ulnar artery 108B-2 of the user, and a third set of SMI sensors 114C are positioned and oriented over the probable location of one or more wrist tendons 108A of the user. As shown, the first set of SMI sensors 114A and the second set of SMI sensors 114B include one or more SMI sensors 114 configured as shown in FIG. 3A or FIG. 3B such that the first set of SMI sensors 114A is configured to provide SMI signals including information about blood flow in the radial artery 108B-1, and the second set of SMI sensors 114B is configured to provide SMI signals including information about blood flow in the ulnar artery 108B-2. With blood flow information from two blood vessels 108B, and in particular two major arteries, the processing circuitry 116 may be able to better determine biometric data about a user such as blood flow, heart rate, respiration rate, and blood pressure. The third set of SMI sensors 114C may include one or more SMI sensors 114 configured as shown in FIG. 4 such that the third set of SMI sensors 114C is configured to provide SMI signals including information about the movement of the wrist tendons 108A. The placement of the third set of SMI sensors 114C may allow for high resolution movement detection of the wrist tendons 108A, which may enable the processing circuitry 116 to better determine information such as gestures performed by a user. Notably, the position, orientation, and configuration of the sensors 114 shown in FIG. 6 is merely exemplary. The sensors 114 may be distributed in any desired pattern throughout the band 104.

Notably, the sensors 114 in FIG. 6 are configured to provide SMI signals including information about different anatomical features of a user. In particular, the first set of SMI sensors 114A may provide a first set of SMI signals including information about a first anatomical feature (e.g., the radial artery 108B-1), the second set of SMI sensors 114B may provide a second set of SMI signals including information about a second anatomical feature (e.g., the ulnar artery 108B-2), and the third set of SMI sensors 114C may provide a third set of SMI signals including information about a third anatomical feature (e.g., the wrist tendons 108A). The processing circuitry 116 may receive the SMI signals from all of the sensors and thus be provided with information about several anatomical features simultaneously. The processing circuitry 116 may use the diverse information provided by one or more signals of the first set of SMI signals, the second set of SMI signals, and/or the third set of SMI signals to better determine biometric data such as blood flow, blood pressure, heart rate, respiration rate, and movement.

Figure 7:
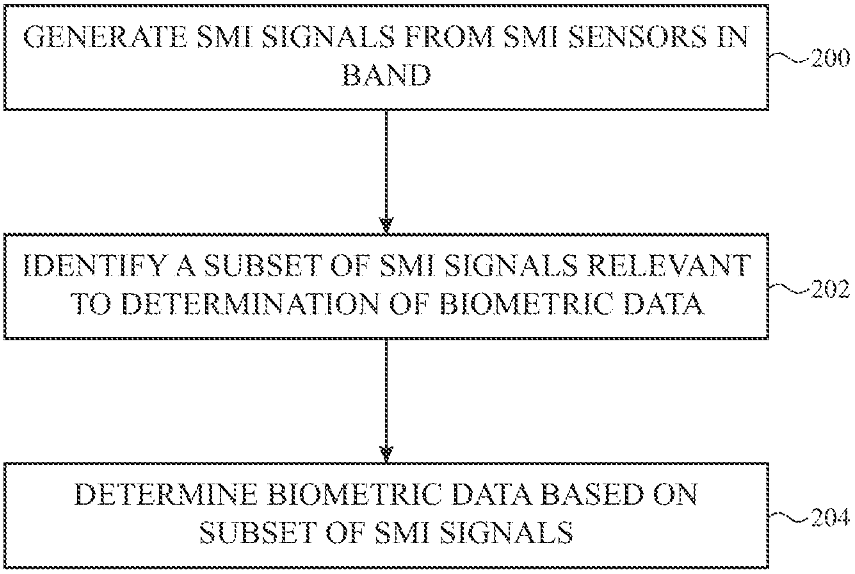
FIG. 7 shows a block diagram illustrating a method for operating a wearable device, such as described herein.

As discussed herein, regardless of how sensors are distributed in the band of a wearable device, due to differences in the anatomy of users, when the wearable device is worn, some of the sensors may provide relevant or valuable data, while the data from other ones of the sensors will not be relevant or usable (e.g., due to their location when worn). Accordingly, FIG. 7 is a block diagram illustrating a method for operating a wearable device according to one embodiment of the present disclosure, such as the wearable device discussed herein with respect to FIGS. 1-6. As discussed herein, a number of SMI signals are generated from one or more SMI sensors disposed in a band of the wearable device (step 200). Generating the SMI signals may include emitting electromagnetic radiation toward one or more anatomical features, receiving partially reflected and/or backscattered electromagnetic radiation which self-mixing with generated electromagnetic radiation, and generating the SMI signals based on a measurement of the self-mixing. The SMI sensors may be disposed in the band of the wearable device in any suitable configuration, such as those discussed herein with respect to FIGS. 1-6.

Due to differences in the anatomy of users and/or differences in orientation of a wearable device, some of the SMI sensors may be positioned and oriented over anatomical features of the user that are relevant to the determination of desired biometric data, while other ones of the SMI sensors will not be. Accordingly, a subset of SMI signals relevant to the determination of biometric data about the user is identified (step 202). The subset of SMI signals may be identified by processing circuitry in the wearable device, or by any other suitable circuitry. The subset of SMI signals may be identified based on characteristics of the SMI signals themselves. For example, the subset of SMI signals may be identified based on whether the SMI signals have a SNR above a threshold. As another example, the subset of SMI signals may be identified based on whether the SMI signals match a pattern, which may be identified and determined, for example, by a machine learning model. The subset of SMI signals may also be identified based on information known about the SMI sensors from which the SMI signals are provided. For example, when calculating biometric data related to blood flow, only SMI signals from SMI sensors suspected or known to be positioned and oriented over probable locations of blood vessels may be used. As another example, when calculating movement data, only SMI signals from SMI sensors known to be positioned and oriented over probable locations of tendons or ligaments may be used. Identification of the subset of SMI signals may be triggered by the occurrence of events such as when a user puts on the wearable device. In some embodiments, identification of the subset of SMI signals may be performed periodically at some predetermined interval.

Once the subset of SMI signals is identified, the biometric data is determined based thereon (step 204). Determining the biometric data may include performing calculations using information obtained form the subset of SMI signals, providing the subset of SMI signals to a machine learning model, or the like. In some embodiments, determining the biometric data may include first combining the information obtained from the subset of SMI signals with information from one or more other sensors, such as sensors located in a housing of the wearable device.

Figure 8:
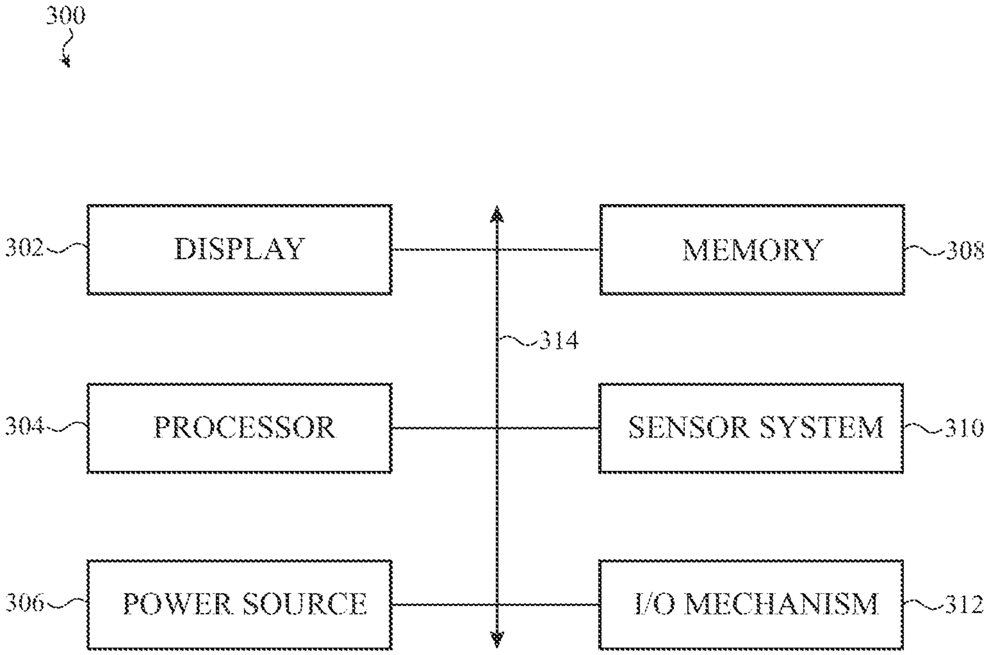
FIG. 8 shows an example electrical block diagram of a wearable device, such as described herein.

FIG. 8 shows a sample electrical block diagram of a wearable device 300, which may be implemented as any of the devices described with respect to FIGS. 1-6. The wearable device 300 may include an electronic display 302 (e.g., a light-emitting display), a processor 304 (also referred to herein as processing circuitry), a power source 306, a memory 308, or storage device, a sensor system 310, an input/output (I/O) mechanism 312 (e.g., an input/output device, input/output port, or haptic input/output interface). The processor 304 may control some or all of the operations of the wearable device 300. The processor 304 may communicate, either directly or indirectly, with some or all of the other components of the wearable device 300. For example, a system bus or other communication mechanism 314 can provide communication between the electronic display 302, the processor 304, the power source 306, the memory 308, the sensor system 310, and the I/O mechanism 312.

The processor may be implemented as any electronic device capable of processing, receiving, or transmitting data or instructions, whether such data or instructions is in the form of software or firmware or otherwise encoded. For example, the processor 304 may include a microprocessor, central processing unit (CPU), an application-specific integrated circuit (ASIC), a digital signal processor (DSP), a controller, or a combination of such devices. As described herein, the term "processor" or "processing circuitry" is meant to encompass a single processing unit, multiple processors, multiple processing units, or other suitably configured computing element or elements. In some embodiments, the processor 304 may provide part or all of the processing systems, processing circuitry, or processors described with reference to any of FIGS. 1-6.

It should be noted that the components of the wearable device 300 can be controlled by multiple processors. For example, select components of the wearable device 300 (e.g., the sensor system 310) may be controlled by a first processor and other components of the wearable device 300 (e.g., the electronic display 302) may be controlled by a second processor, where the first and second processors may or may not be in communication with each other.

The power source 306 can be implemented with any device capable of providing energy to the wearable device 300. For example, the power source 306 may include one or more batteries or rechargeable batteries. Additionally or alternatively, the power source 306 may include a power connector or power cord that connects the wearable device 300 to another power source, such as a wall outlet.

The memory 308 may store electronic data that can be used by the wearable device 300. For example, the memory 308 may store electrical data or content such as, for example, audio and video files, documents and applications, device settings and user preferences, timing signals, control signals, and data structures and databases. The memory 308 may include any type of memory. By way of example only, the memory 308 may include random access memory (RAM), read-only memory (ROM), flash memory, removeable memory, other types of storage elements, or combinations of such memory types.

The wearable device 300 may also include one or more sensor systems 310 positioned almost anywhere on the wearable device 300. For example, the sensor system 310 may include any and all of the sensors discussed herein with respect to FIGS. 1-6. The sensor system 310 may be configured to sense one or more types of parameters, such as but not limited to: vibration, light, touch, force, heat, movement, relative motion, biometric data (e.g., biological parameters) of a user, air quality, proximity, position, or connectedness. By way of example, the sensor system 310 may include one or more SMI sensors as discussed herein with respect to FIGS. 1-6, a heat sensor, a position sensor, a light or optical sensor, an accelerometer, a pressure transducer, a gyroscope, a magnetometer, a health monitoring sensor, and/or an air quality sensor. Additionally, the one or more sensor systems 310 may utilize any suitable sensing technology, including, but not limited to, interferometric, magnetic, capacitive, ultrasonic, resistive, optical, acoustic, piezoelectric, or thermal technologies.

The I/O mechanism 312 may transmit or receive data from a user or another electronic device. The I/O mechanism 312 may include the electronic display 302, a touch sensing input surface, a crown, one or more buttons (e.g., a graphical user interface "home" button), one or more cameras (including an under-display camera), one or more microphones or speakers, one or more ports such as a microphone port, and/or a keyboard. Additionally or alternatively, the I/O mechanism 312 may transmit electronic signals via a communications interface, such as a wireless, wired, and/or optical communications interface. Examples of wireless and wired communications interfaces include, but are not limited to, cellular and Wi-Fi communications interfaces.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the teachings herein.

As described herein, one aspect of the present technology may be the gathering and use of data available from various sources, including biometric data (e.g., information about a person's blood flow, blood pressure, heart rate, respiration rate, and movement). The present disclosure contemplates that, in some instances, this gathered data may include personal information data that uniquely identifies or can be used to identify, locate, or contact a specific person. Such personal information data can include, for example, biometric data and data linked thereto (e.g., demographic data, location-based data, telephone numbers, email addresses, home addresses, data or records relating to a user's health or level of fitness (e.g., vital signs measurements, medication information, exercise information), date of birth, or any other identifying or personal information).

The present disclosure recognizes that the use of such personal information data, in the present technology, can be used to the benefit of users. For example, the personal information data can be used to authenticate a user to access their device, or gather performance metrics for the user's interaction with an augmented or virtual world. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide data to targeted content delivery services. In yet another example, users can select to limit the length of time data is maintained or entirely prohibit the development of a baseline profile for the user. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other nonpersonal information available to the content delivery services, or publicly available information.

What is claimed is:

1. A wearable device, comprising:
a band having a band interior opposite a band exterior, the band operable to attach the wearable device to a user, the band defining a cavity, and a portion of the band interior separating the cavity from the user;
a set of one or more self-mixing interferometry (SMI) sensors disposed in the cavity and configured to:
emit electromagnetic radiation toward the portion of the band interior; and
generate a set of one or more SMI signals including information indicative of movement of the portion of the band interior; and
processing circuitry configured to:
determine motion of one or more tendons or ligaments of a portion of the user positioned in the band interior based, at least in part, on the set of one or more SMI signals; and
determine a gesture performed by the user based, at least in part, on the determined motion of the one or more tendons or ligaments.

2. The wearable device of claim 1, wherein the processing circuitry is configured to operate the set of one or more SMI sensors and characterize movement of the user based, at least in part, on the set of one or more SMI signals.

3. The wearable device of claim 1, wherein the gesture is a hand gesture.

4. The wearable device of claim 1, further comprising:
a housing attached to the band; wherein,
the processing circuitry is disposed in the housing; and
the band includes a set of one or more signal carriers, the set of one or more signal carriers coupling the processing circuitry to the set of one or more SMI sensors.

5. The wearable device of claim 1, wherein:
the portion of the band interior defines a first cavity wall;
a second cavity wall is opposite the first cavity wall;
a cavity sidewall joins the first cavity wall and the second cavity wall;
the first cavity wall is deformable; and
the second cavity wall and the cavity sidewall are rigid.

6. The wearable device of claim 5, wherein when the wearable device is worn by the user the portion of the band interior contacts a portion of a volar aspect of a wrist of the user.

7. A method of operating a wearable device, the method comprising:

generating a plurality of self-mixing interferometry (SMI) signals, each from a respective SMI sensor disposed in a band and positioned to emit electromagnetic radiation toward a band interior of the band, the band operable to attach the wearable device to a user;

identifying, by a processor of the wearable device, a first subset of the plurality of SMI signals relevant to a determination of biometric data about the user;

determining, by the processor of the wearable device and based, at least in part, on the first subset of the plurality of SMI signals, the biometric data about the user;

identifying, by a processor of the wearable device, a second subset of the plurality of SMI signals relevant to the determination of movement of a portion of the user positioned in the band interior; and determining, by the processor of the wearable device and based, at least in part, on the second subset of the plurality of SMI signals, movement of a portion of the user positioned in the band interior.

8. The method of claim 7, wherein identifying the first subset of the plurality of SMI signals relevant to the determination of biometric data about the user comprises identifying which of the plurality of SMI signals has a signal to noise ratio above a threshold.

9. The method of claim 7, wherein identifying the first subset of the plurality of SMI signals relevant to the determination of biometric data about the user comprises identifying which of the plurality of SMI signals includes information about one or more anatomical features of interest of the user.

10. The method of claim 7, wherein identifying the first subset of the plurality of SMI signals relevant to the determination of biometric data about the user comprises identifying which of the plurality of SMI signals include information related to desired biometric data of the user.

11. The method of claim 7, wherein the biometric data about the user comprises at least one of:

blood flow;

blood pressure;

heart rate; or respiration rate.

12. A wearable device, comprising:

a band operable to attach the wearable device to a user;

a first set of self-mixing interferometry (SMI) sensors disposed in the band and configured to:

emit electromagnetic radiation toward a first anatomical feature of the user; and generate a first set of SMI signals including information about the first anatomical feature;

a second set of SMI sensors disposed in the band and configured to:

emit electromagnetic radiation toward a second anatomical feature of the user; and generate a second set of SMI signals including information about the second anatomical feature; and processing circuitry communicably coupled to the first set of SMI sensors and the second set of SMI sensors and configured to determine information about the user using one or more SMI signals from the first set of SMI sensors and one or more SMI signals from the second set of SMI sensors.

13. The wearable device of claim 12, wherein:

the first anatomical feature of the user is a first blood vessel and the second anatomical feature of the user is a second blood vessel;

SMI sensors in the first set of SMI sensors are positioned and oriented, within the band, to emit electromagnetic radiation toward probable locations of the first blood vessel; and SMI sensors in the second set of SMI sensors are positioned and oriented, within the band, to emit electromagnetic radiation toward probable locations of the second blood vessel.

14. The wearable device of claim 13, wherein the first anatomical feature is a radial artery and the second anatomical feature is an ulnar artery.

15. The wearable device of claim 12, wherein:

the first anatomical feature of the user is a blood vessel and the second anatomical feature of the user comprises one or more of a tendon, a ligament, or a muscle; and SMI sensors in the first set of SMI sensors are positioned and oriented, within the band, to emit electromagnetic radiation toward probable locations of the blood vessel; and SMI sensors in the second set of SMI sensors are positioned and oriented, within the band, to emit electromagnetic radiation toward probable locations of or one or more of the tendon, the ligament, or the muscle.

16. The wearable device of claim 15, wherein:

the band has a band interior opposite a band exterior, the band defines a cavity, and a portion of the band interior separates the cavity from the user;

when the wearable device is worn by the user, the portion of the band interior is over the second anatomical feature of the user; and the second set of SMI sensors is disposed in the cavity and configured to:

emit electromagnetic radiation toward the portion of the band interior; and generate the second set of SMI signals including information indicative of movement of the portion of the band interior.

17. The wearable device of claim 12, wherein the information about the user comprises a gesture performed by the user.

18. The wearable device of claim 12, wherein the information about the user comprises biometric data about the user.

19. The wearable device of claim 12, wherein the processing circuitry is further configured to dynamically identify the first set of SMI sensors and the second set of SMI sensors from a plurality of SMI sensors.

* * * * *